United States Patent
Li et al.

(10) Patent No.: US 12,039,967 B2
(45) Date of Patent: Jul. 16, 2024

(54) METHOD FOR EVALUATING SATISFACTION WITH VOICE INTERACTION, DEVICE, AND STORAGE MEDIUM

(71) Applicant: Beijing Baidu Netcom Science Technology Co., Ltd., Beijing (CN)

(72) Inventors: Yanyan Li, Beijing (CN); Dejing Dou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 403 days.

(21) Appl. No.: 17/520,799

(22) Filed: Nov. 8, 2021

(65) Prior Publication Data

US 2022/0059074 A1 Feb. 24, 2022

(30) Foreign Application Priority Data

Dec. 2, 2020 (CN) .......................... 202011393344.5

(51) Int. Cl.
*G10L 15/01* (2013.01)
*G10L 15/02* (2006.01)
*G10L 15/06* (2013.01)
*G10L 15/22* (2006.01)

(52) U.S. Cl.
CPC .............. *G10L 15/01* (2013.01); *G10L 15/02* (2013.01); *G10L 15/063* (2013.01); *G10L 15/22* (2013.01); *G10L 2015/225* (2013.01)

(58) Field of Classification Search
CPC ....... G10L 15/01; G10L 15/02; G10L 15/063; G10L 15/22; G10L 2015/225
See application file for complete search history.

(56) References Cited

U.S. PATENT DOCUMENTS

2017/0214799 A1* 7/2017 Perez .................. H04M 3/5166
2023/0410834 A1* 12/2023 Ando ..................... G10L 15/07

FOREIGN PATENT DOCUMENTS

| CN | 108388926 | 8/2018 |
| CN | 111428017 | 7/2020 |
| CN | 111666396 | 9/2020 |

OTHER PUBLICATIONS

Office Action issued in corresponding Chinese Application No. 202011393344.5, dated Mar. 31, 2023.

* cited by examiner

*Primary Examiner* — Sonia L Gay
(74) *Attorney, Agent, or Firm* — NORTON ROSE FULBRIGHT US LLP (57) ABSTRACT

A method for evaluating satisfaction with voice interaction, a device, and a storage medium are provided, which are related to a technical field of artificial intelligence, in particular, to fields of natural language processing, knowledge graph and deep learning, and can be applied to user intention understanding. The specific implementation includes: acquiring sample interaction data of a plurality of rounds of sample voice interaction behaviors; performing feature extractions on respective sample interaction data, to obtain a sample interaction feature sequence; acquiring satisfaction marks corresponding to the respective sample interaction data, to obtain a satisfaction mark sequence; and training an initial model by using a plurality of sets of sample interaction feature sequences and of satisfaction mark sequences, to obtain the model for evaluating satisfaction.

18 Claims, 8 Drawing Sheets

METHOD FOR EVALUATING SATISFACTION WITH VOICE INTERACTION, DEVICE, AND STORAGE MEDIUM

CROSS-REFERENCE TO RELATED APPLICATIONS

This application claims priority to Chinese patent application, No. 202011393344.5, entitled "Method and Apparatus for Evaluating Satisfaction with Voice Interaction, Device, and Storage Medium", filed with the Chinese Patent Office on Dec. 2, 2020, which is hereby incorporated by reference in its entirety.

TECHNICAL FIELD

The present disclosure relates to a technical field of artificial intelligence, in particularly, to fields of natural language processing, knowledge graph, and deep learning.

BACKGROUND

With the development of artificial intelligence algorithms and computational power, intelligent voice devices have been popularized in short days. Different types of intelligent voice devices can cover various application scenes, and an intelligent loudspeaker is one of the most representative ones. A user may enable many operations of the intelligent loudspeaker through voice instructions without manual searches, such as playing songs or videos, checking the weather, and controlling intelligent home appliances.

SUMMARY

According to the present disclosure, it is provided a method and apparatus for evaluating satisfaction with voice interaction, a device, and a storage medium.

According to a first aspect of the present disclosure, it is provided a method for generating a model for evaluating satisfaction with voice interaction, including:

acquiring sample interaction data of a plurality of rounds of sample voice interaction behaviors:

performing feature extractions on respective sample interaction data, to obtain a sample interaction feature sequence, wherein respective sample interaction features in the sample interaction feature sequence are sorted according to a time order of corresponding sample voice interaction behaviors:

acquiring satisfaction marks corresponding to the respective sample interaction data, to obtain a satisfaction mark sequence, wherein respective satisfaction mark data in the satisfaction mark sequence are sorted according to a time order of corresponding sample voice interaction behaviors; and training an initial model by using a plurality of sets of sample interaction feature sequences and of satisfaction mark sequences, to obtain the model for evaluating satisfaction, wherein the model for evaluating satisfaction is used for evaluating satisfaction with respective rounds of to-be-evaluated voice interaction behaviors according to to-be-evaluated interaction data for a plurality of rounds of to-be-evaluated voice interaction behaviors.

According to a second aspect of the present disclosure, it is provided a method for evaluating satisfaction with voice interaction, including:

acquiring to-be-evaluated interaction data of a plurality of rounds of to-be-evaluated voice interaction behaviors:

performing feature extractions on respective to-be-evaluated interaction data, to obtain a to-be-evaluated interaction feature sequence, wherein respective to-be-evaluated interaction features in the to-be-evaluated interaction feature sequence are sorted according to a time order of corresponding to-be-evaluated voice interaction behaviors; and inputting the to-be-evaluated interaction feature sequence into a model for evaluating satisfaction, to evaluate satisfaction with respective rounds of to-be-evaluated voice interaction behaviors, wherein the model for evaluating satisfaction is obtained by the generation method according to an embodiment of the present disclosure.

According to a third aspect of the present disclosure, it is provided an apparatus for generating a model for evaluating satisfaction with voice interaction, including:

a sample interaction data acquisition module, configured for acquiring sample interaction data of a plurality of rounds of sample voice interaction behaviors;

a sample interaction feature sequence determination module, configured for performing feature extractions on respective sample interaction data, to obtain a sample interaction feature sequence, wherein respective sample interaction features in the sample interaction feature sequence are sorted according to a time order of corresponding sample voice interaction behaviors;

a satisfaction mark sequence determination module, configured for acquiring satisfaction marks corresponding to the respective sample interaction data, to obtain a satisfaction mark sequence, wherein respective satisfaction mark data in the satisfaction mark sequence are sorted according to a time order of corresponding sample voice interaction behaviors; and a training module, configured for training an initial model by using a plurality of sets of sample interaction feature sequences and of satisfaction mark sequences, to obtain the model for evaluating satisfaction, wherein the model for evaluating satisfaction is used for evaluating satisfaction with respective rounds of to-be-evaluated voice interaction behaviors according to to-be-evaluated interaction data for a plurality of rounds of to-be-evaluated voice interaction behaviors.

According to a fourth aspect of the present disclosure, it is provided an apparatus for evaluating satisfaction with voice interaction, including:

a to-be-evaluated interaction data acquisition module, configured for acquiring to-be-evaluated interaction data of a plurality of rounds of to-be-evaluated voice interaction behaviors;

a to-be-evaluated interaction feature sequence determination module, configured for performing feature extractions on respective to-be-evaluated interaction data, to obtain a to-be-evaluated interaction feature sequence, wherein respective to-be-evaluated interaction features in the to-be-evaluated interaction feature sequence are sorted according to a time order of corresponding to-be-evaluated voice interaction behaviors; and an evaluation module, configured for inputting the to-be-evaluated interaction feature sequence into a model for evaluating satisfaction, to evaluate satisfaction with respective rounds of to-be-evaluated voice interaction behaviors, wherein the model for evaluating satisfaction is obtained by the generation apparatus according to an embodiment of the present disclosure.

According to a fifth aspect of the present disclosure, it is provided an electronic device, including:

at least one processor; and a memory communicatively connected to the at least one processor, wherein the memory stores instructions executable by the at least one processor, and the instructions are executed by the at least one processor to enable the at least one processor to perform the method provided in any one of embodiments herein.

According to a sixth aspect of the present disclosure, a non-transitory computer-readable storage medium storing computer instructions is provided, wherein the computer instructions, when executed by a computer, cause the computer to perform the method provided in any one of embodiments herein.

It should be understood that content in this section is not intended to identify key or critical features of embodiments of the present disclosure, nor is it intended to limit the scope of the present disclosure. Other features of the present disclosure will become readily apparent from the following description.

BRIEF DESCRIPTION OF THE DRAWINGS

The drawings are used to better understand the scheme and do not constitute a limitation to the present disclosure. In the drawings.

DETAILED DESCRIPTION

Exemplary embodiments of the present disclosure will be described below in combination with drawings, including various details of embodiments of the present disclosure to facilitate understanding, which should be considered as exemplary only. Therefore, those of ordinary skill in the art should realize that various changes and modifications can be made to the embodiments described herein without departing from the scope and spirit of the present disclosure. Likewise, descriptions of well-known functions and structures are omitted in the following description for clarity and conciseness.

It's critical for an intelligent voice device to recognize user's instructions and to understand intention efficiently and accurately, so the ability of voice recognition and intention understanding is an important index in the evaluation of the intelligence of an intelligent voice device. Those engaged in the research and development have focused on how to reasonably evaluate the accuracy of the intelligent voice device in understanding user intention, so that the evaluation result can truly reflect the performance of intelligent products.

Figure 1:
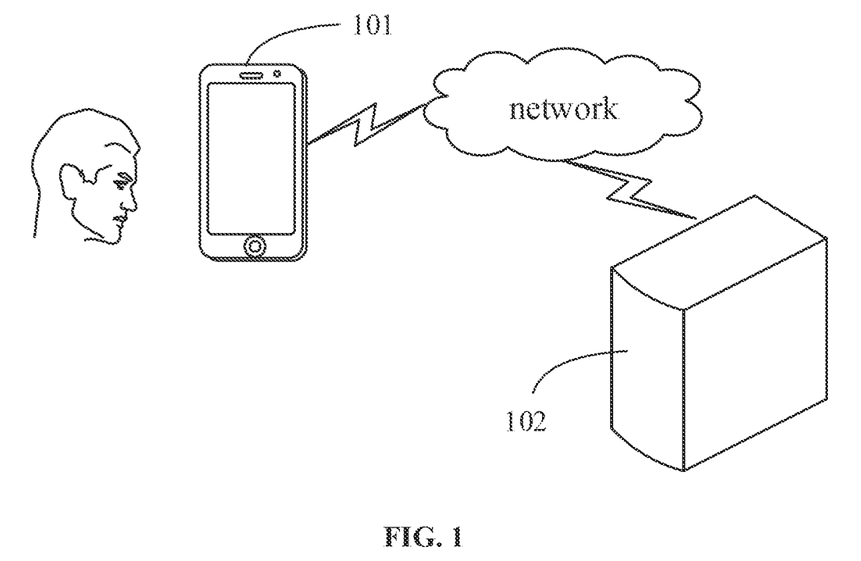
FIG. 1 is a schematic diagram of an application scenario according to an embodiment of the present disclosure.

FIG. 1 is a schematic diagram of an application scenario of an embodiment of the present disclosure. As shown in FIG. 1, the intelligent voice device 101 may be an intelligent loudspeaker, a mobile phone, a tablet, a vehicle-mounted terminal, a personal computer, etc. This embodiment does not particularly limit the implementation of the intelligent voice device 101 as long as the intelligent voice device 101 is capable of voice interaction with a user.

Voice interaction is based on voice recognition, voice synthesis, natural language understanding and other technologies, which can, in a variety of practical application scenarios, provide an intelligent voice device product with capabilities of "hearing, speaking, and understanding" and thus enable intelligent human-computer interaction. The application scenarios include intelligent Q&A, intelligent media playing, intelligent searching, and the like.

The user inputs a voice instruction into the intelligent voice device 101 by giving a voice, and the intelligent voice device 101 can receive the intention of the user according to the voice instruction, figure out the intention through natural language understanding, and feed a response back to the user corresponding to the intention. Alternatively, the intelligent voice device 101 may transmit the voice instruction input by the user to a server 102, and then the server 202 receives the intention of the user according to the voice instruction, figures out the intention through natural language understanding, and feeds back a response corresponding to the intention to the user through the intelligent voice device 101.

The evaluation of satisfaction with voice interaction can be used for evaluating the accuracy of intention understanding and further evaluating the performance of the intelligent voice device product.

Figure 2:
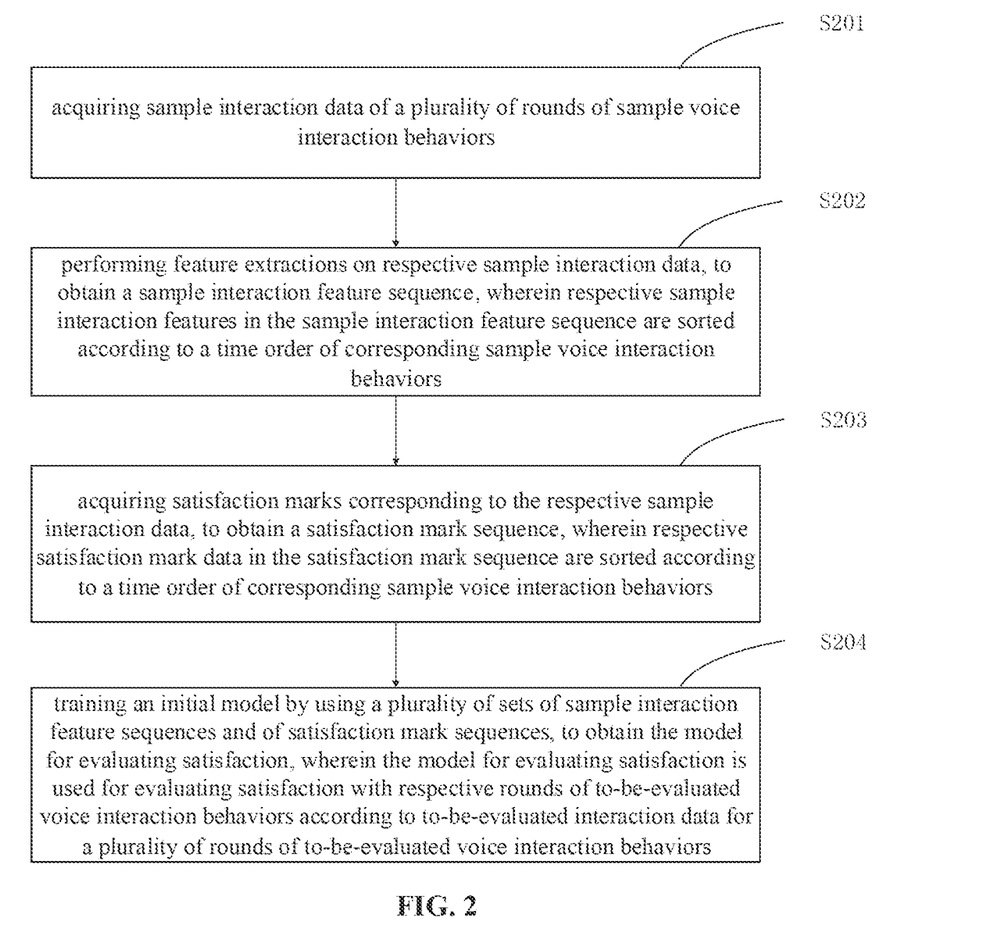
FIG. 2 is a flowchart of a method for generating a model for evaluating satisfaction with voice interaction according to an embodiment of the present disclosure.

According to an embodiment herein, as shown in FIG. 2, it is provided a method for generating a model for evaluating satisfaction with voice interaction, including:

S201: acquiring sample interaction data of a plurality of rounds of sample voice interaction behaviors:

S202: performing feature extractions on respective sample interaction data, to obtain a sample interaction feature sequence, wherein respective sample interaction features in the sample interaction feature sequence are sorted according to a time order of corresponding sample voice interaction behaviors:

S203: acquiring satisfaction marks corresponding to the respective sample interaction data, to obtain a satisfaction mark sequence, wherein respective satisfaction mark data in the satisfaction mark sequence are sorted according to a time order of corresponding sample voice interaction behaviors; and S204: training an initial model by using a plurality of sets of sample interaction feature sequences and of satisfaction mark sequences, to obtain the model for evaluating satisfaction, wherein the model for evaluating satisfaction is used for evaluating satisfaction with respective rounds of to-be-evaluated voice interaction behaviors according to to-be-evaluated interaction data for a plurality of rounds of to-be-evaluated voice interaction behaviors.

Voice interaction behaviors of the user with the intelligent voice device 101 usually include a plurality of rounds, that is, the user sends a voice instruction 1 followed by a response 1, the user sends a voice instruction 2 followed by a device response 2, . . . and so on, where one instruction sent by the user and one device response that follows constitute one round of voice interaction, and each round of voice interaction corresponds to satisfaction.

In the generation manner according to an embodiment herein, firstly, sample interaction data corresponding to each round of sample voice interaction behaviors are acquired to obtain a plurality of groups of sample interaction data. Each group of sample interaction data includes the voice instruction of the user and the device response, where the device response may be a voice or an operation performed by the device, such as a volume-up operation.

Features are extracted from each group of sample interaction data to obtain a plurality of groups of sample interaction features. The groups of sample interaction features are sorted according to a time order of the sample voice interaction behaviors corresponding respectively to the sample interaction features, to form a sequence of sample interaction features. The satisfaction marks corresponding to the groups of sample interaction data are acquired, for example, the satisfaction with each group of sample interaction data can be manually marked to obtain the satisfaction marks of each round of sample voice interaction behaviors, and the satisfaction marks are sorted according to a time order of the sample voice interaction behaviors corresponding respectively to the satisfaction marks to form a sequence of sample satisfaction.

After that, an initial model is constructed and trained on the basis of a great deal of training data (i.e., a plurality of groups of sequences of interaction features and corresponding sequences of sample satisfaction), and the model for evaluating satisfaction is obtained after the training. Features are extracted from the to-be-evaluated interaction data in the rounds of to-be-evaluated voice interaction to obtain a sequence of to-be-evaluated interaction features. The model for evaluating satisfaction can output a sequence of satisfaction evaluations for the input sequence of to-be-evaluated interaction features, and the sequence of satisfaction evaluations includes a plurality of satisfaction evaluation values corresponding respectively to the rounds of to-be-evaluated voice interaction behaviors.

In the model for evaluating satisfaction generated according to an embodiment herein, the satisfaction with the user intention understanding in the rounds of voice interaction behaviors can be evaluated, and the coherence between adjacent rounds of voice interaction behaviors is ensured, so that the satisfaction with a sequence of intentions can be accurately and efficiently evaluated on the basis of rounds of voice operations of the user.

In one embodiment, the sample interaction feature obtained by extracting features from the sample interaction data include a user feature and a device feature. Because both the user feature and the device feature are considered, the accuracy of satisfaction evaluation can be improved.

The user features include at least one of pacing, a length of a voice, time information, a mood analysis based on tone, and a semantic subject of the voice. The device features include at least one of a subject of a response, a duration of playing the voice, and completion or noncompletion of playing the voice. The user features and the device features are thus further divided, respectively, to evaluate from multiple dimensions, so that the accuracy of satisfaction evaluation can be further improved.

In an embodiment, S202 may include: abstracting a plurality of sequences of sample behaviors from each sample interaction datum, where the plurality of sequences of sample behaviors correspond to a plurality of rounds of sample voice interaction behaviors, the sequence of sample behaviors includes at least one of pacing, a length of a voice, time information, a mood analysis based on tone, and a semantic subject of the voice of a user, and at least one of a subject of a response, a duration of playing the voice, and completion or noncompletion of playing the voice of a device; extracting features from the sequence of sample behaviors to obtain the sample interaction features; and sorting the sample interaction features according to the time order of the corresponding sample voice interaction behaviors, to obtain the sequence of sample interaction features.

In other words, the sequence of behavior can be abstracted from interaction data according to interaction and operation features, and then the sequence of behaviors is subjected to feature extraction to obtain interaction features.

In an example, the abstracted sequence of behaviors includes: pacing, a length of a voice, time information, a mood analysis based on tone, and a semantic subject of the voice of the user; and a subject of a response, a duration of playing the voice, and completion or noncompletion of playing the voice of the intelligent voice device, and the like.

The subject of the response here is obtained by classifying the operation behaviors of the intelligent loudspeaker, including control (001), audio-visual (002), game (003), news (004), education (005), entertainment (006), home appliance control (007), and the like. Each parent class of operations further includes sub-operations. For example, the parent class of audio-visual (002) further includes song play (0001), video play (0002), playlist (0003), progress bar (0004), switch to another (0005), song information (0006), artist information (0007), play video (0008), video information (0009), completion of play (0010) and the like; for another example, the parent class of control (001) further includes volume up (0001), volume down (0002), exit (0003), shut down (0004), basic settings (0005), wake up (0006) and the like; for yet another example, the parent class of news (004) further weather check (0001), completion of play (0002), and the like.

Examples of six rounds of sample voice interaction behaviors are given below:

(1) the user sends a voice instruction: Hi, Xiaodu Xiaodu (50/min, 9:00 am, 4, happy, device control . . . );
device response: I am here (00100006, 5s, yes . . . );
satisfaction mark: [Satisfactory]
(2) the user sends a voice instruction: play Jay Chou's songs (40/min, 9:00 am, 4, happy, song . . . );
device response: OK, play the song Common Jasmine Orange for you (0020001, 120s, No . . . );
satisfaction mark: [Satisfactory]
(3) the user sends a voice instruction: turn up the volume (30/min, 9:02 am, 4, neutral, device control . . . );
device response: volume is turned up (0010001, 10s, yes . . . );
satisfaction mark: [Satisfactory]
(4) the user sends a voice instruction: how is the weather in Beihai (55/min, 9:03 am, 4, neutral, device control . . . );
device response: the weather in Shanghai (0040001, 15s, No . . . ):
satisfaction mark: [Unsatisfactory]
(5) the user sends a voice instruction: how is the weather in Beihai, Guangxi Zhuang Autonomous Region (45/min, 9:04 am, 4, upset, equipment control . . . );
device response: the weather in Beihai (0040001, 30s, yes . . . );
satisfaction mark: [Satisfactory]

(6) the user sends a voice instruction: exit (20/min, 9:05 am, 4, neutral, device control . . . );

device response: exit (0010003, 3s, yes . . . );

satisfaction mark: [Satisfactory]

Features are extracted from the six rounds of sequences of behaviors (i.e., those included in brackets corresponding to a voice instruction sent by the user and a device response) to obtain the sequence of interaction features: the corresponding sequence of satisfaction marks is as follows: (Satisfactory, Satisfactory, Satisfactory, Unsatisfactory, Satisfactory, Satisfactory).

The sequence of interaction data is formed, and then features are extracted, so that the user behavior data and the device behavior data can be abstracted into analyzable data, the feature extraction is simplified, and its efficiency is improved.

In an embodiment, the initial model employed in the embodiment herein is a Conditional Random Field (CRF) model. Given P(Y|X) is a linear chain conditional random field, the conditional probability that a random variable Y takes a value y if the random variable X takes a value x has the following form:

$$P(Y\mid X) = \frac{1}{Z(X)}\exp(\Sigma_{i,k}\lambda_k t_k(y_{i-1}, y_i, x, i) + \Sigma_{i,l}u_l s_l(y_i, x, i));$$

where $Z(X) = \Sigma_y \exp(\Sigma_{i,k}\lambda_k t_k(y_{i-1}, y_i, x, i) + \Sigma_{i,l}u_l s_l(y_i, x, i))$, x represents an interaction feature sequence: $y_i$ represents a satisfaction mark corresponding to an i-th round of voice interaction behavior; $t_k(y_{i-1}, y_i, x, i)$ represents a first parameter function constructed on the basis of satisfaction with a previous round of voice interaction behavior, satisfaction with a current round of voice interaction behavior, and the interaction feature sequence; $s_l(y_i, x, i)$ represents a second parameter function constructed on the basis of satisfaction with the current round of voice interaction behavior and the interaction feature sequence; $\lambda_k$ represents a weight corresponding to the first parameter function, and $u_l$ represents a weight corresponding to the second parameter function; i represents a serial number of voice interaction behaviors: k represents a serial number of a first parameter, and l is a serial number of a second parameter.

For example, $t_1(y_{i-1}, y_i, x, i)=1$ represents that the current round of interaction behaviors are in the state of noncompletion of playing a song, so the probability of being satisfactory is high if the current round of interaction behavior is to turn up the volume, the corresponding weight value $\lambda_k$ should be a positive number, and the larger the value of $\lambda_k$, the more likely the operation this time will be marked as satisfactory (e.g., (3)).

Furthermore, a conditional probability model $\hat{P}(Y|X)$, namely, the model for evaluating satisfaction, is obtained by obtaining a first parameter function, a second parameter function, a weight corresponding to the first parameter function, and a weight corresponding to the second parameter function through maximum likelihood estimation or regularized maximum likelihood estimation based on rounds of sample voice behaviors and the sequence of satisfaction marks of mass users.

The Conditional Random Field is a conditional probability distribution model for a given group of input random variables to output another group of random variables, characterized in that the output random variables form a Markov Random Field. In the scenario of intelligent voice intention understanding of the embodiment herein, the sequence of satisfaction can be evaluated according to the current round of voice interaction behavior and the previous round of voice interaction behavior, so that the efficiency and accuracy of the satisfaction evaluation are improved.

Figure 3:
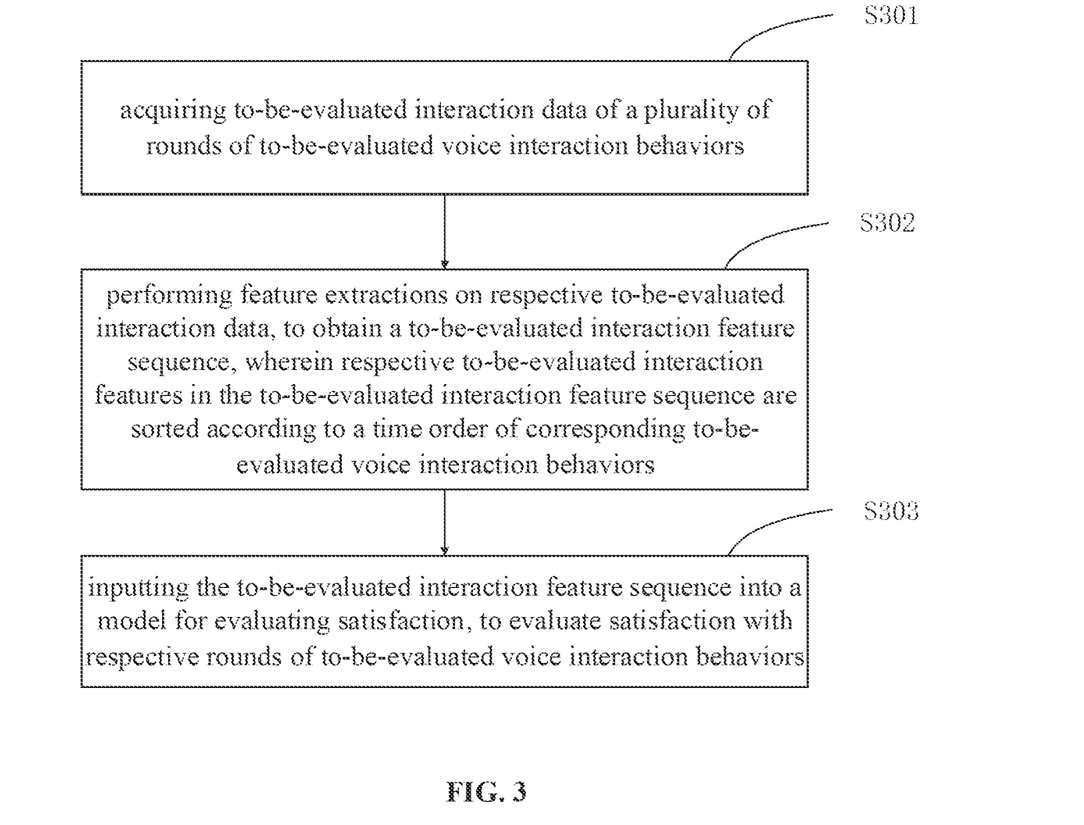
FIG. 3 is a flowchart of a method for evaluating satisfaction with voice interaction according to an embodiment of the present disclosure.

According to an embodiment herein, as shown in FIG. 3, it is further provided a method for evaluating the satisfaction with voice interaction, including:

S301: acquiring to-be-evaluated interaction data of a plurality of rounds of to-be-evaluated voice interaction behaviors;

S302: performing feature extractions on respective to-be-evaluated interaction data, to obtain a to-be-evaluated interaction feature sequence, wherein respective to-be-evaluated interaction features in the to-be-evaluated interaction feature sequence are sorted according to a time order of corresponding to-be-evaluated voice interaction behaviors; and S303: inputting the to-be-evaluated interaction feature sequence into a model for evaluating satisfaction, to evaluate satisfaction with respective rounds of to-be-evaluated voice interaction behaviors, wherein the model for evaluating satisfaction is obtained by the method for generating the model described above.

In an embodiment, S302 may include: abstracting a plurality of to-be-evaluated behavior sequences from the respective to-be-evaluated interaction data, wherein the plurality of to-be-evaluated behavior sequences correspond to the plurality of rounds of to-be-evaluated voice interaction behaviors, the to-be-evaluated behavior sequences include at least one of a voice rate, a voice word count, time information, a mood-based sentiment analysis, and a voice semantic subject of a user, and at least one of a response subject, a playing duration, and a completion or non-completion of playing of a device; performing feature extractions on the to-be-evaluated behavior sequences, to obtain the respective to-be-evaluated interaction features; and sorting the respective to-be-evaluated interaction features according to a time order of corresponding to-be-evaluated voice interaction behaviors, to obtain the to-be-evaluated interaction feature sequence.

In an embodiment, the to-be-evaluated interaction features include a user feature and a device feature. Herein, the user feature includes at least one of pacing, a length of a voice, time information, a mood analysis based on tone, and a semantic subject of the voice, the device feature includes at least one of a subject of a response, a duration of playing the voice, and completion or noncompletion of playing the voice.

Here, the interpretation of the to-be-evaluated voice interaction behaviors, the acquisition manner of the to-be-evaluated interaction data, the acquisition manner of the sequence of to-be-evaluated interaction features and the corresponding technical effects can be seen from the above-mentioned descriptions of the sample voice interaction behaviors, the sample interaction data and the sequence of interaction features in S201 and S202, which will not be described in detail below.

In S303, an output sequence $\hat{y}=(y_1, y_2, \ldots y_T)$ with the largest conditional probability $\hat{P}(Y|X)$ is obtained by inputting the sequence of to-be-evaluated interaction features $X_i=(x_1, x_2, \ldots x_T)$ to the model for evaluating satisfaction. A maximum probability path of the model for evaluating satisfaction is derived with dynamic programming through a Viterbi algorithm to obtain the sequence of satisfaction evaluations corresponding to each round of to-be-evaluated voice interaction behaviors. The sequence of satisfaction evaluations includes a plurality of satisfaction evaluation results, wherein each satisfaction evaluation result corresponds to a round of to-be-evaluated voice interaction behaviors.

The Viterbi algorithm can simplify the process of deriving the maximum probability path, reduce the computations, and improve the evaluation efficiency.

According to the method for evaluating the satisfaction with voice interaction provided by an embodiment herein, the sequence of satisfaction evaluations, namely the satisfaction with all the rounds of voice interaction behaviors, can be obtained for the rounds of voice interaction behaviors, so that the sequence of satisfaction with the user intention understanding can be efficiently and accurately evaluated.

Figure 4:
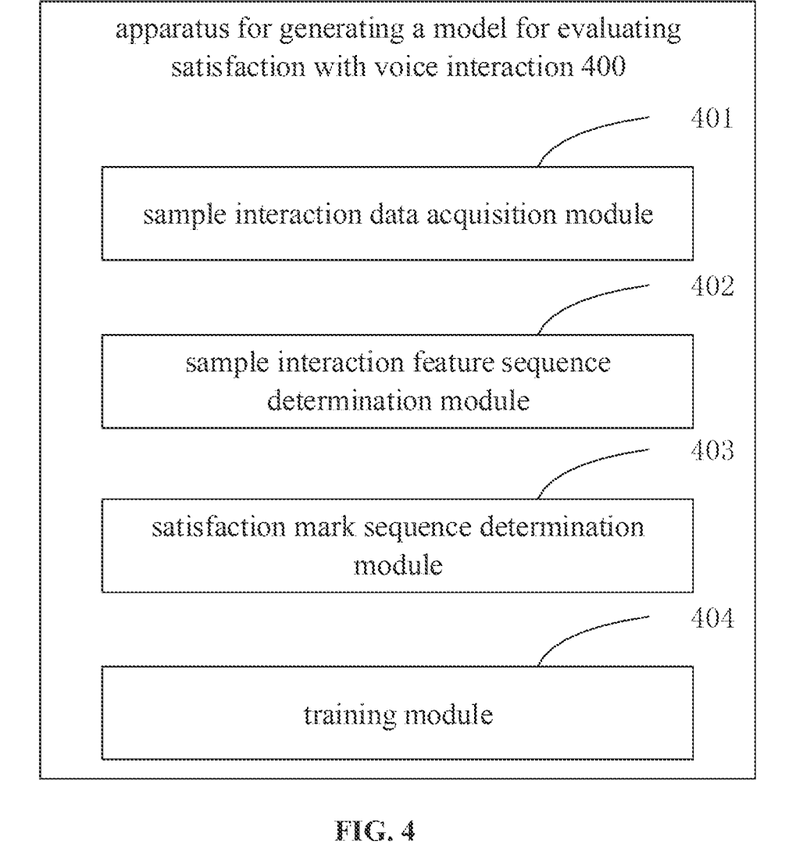
FIG. 4 is a block diagram of an apparatus for generating a model for evaluating satisfaction with voice interaction according to an embodiment of the present disclosure.

According to an embodiment herein, it is further provided an apparatus for generating the model for evaluating the satisfaction with voice interaction, as shown in FIG. 4, the apparatus 400 for generating the model for evaluating the satisfaction with voice interaction includes:

a sample interaction data acquisition module 401, configured for acquiring sample interaction data of a plurality of rounds of sample voice interaction behaviors:

a sample interaction feature sequence determination module 402, configured for performing feature extractions on respective sample interaction data, to obtain a sample interaction feature sequence, wherein respective sample interaction features in the sample interaction feature sequence are sorted according to a time order of corresponding sample voice interaction behaviors:

a satisfaction mark sequence determination module 403, configured for acquiring satisfaction marks corresponding to the respective sample interaction data, to obtain a satisfaction mark sequence, wherein respective satisfaction mark data in the satisfaction mark sequence are sorted according to a time order of corresponding sample voice interaction behaviors; and a training module 404, configured for training an initial model by using a plurality of sets of sample interaction feature sequences and of satisfaction mark sequences, to obtain the model for evaluating satisfaction, wherein the model for evaluating satisfaction is used for evaluating satisfaction with respective rounds of to-be-evaluated voice interaction behaviors according to to-be-evaluated interaction data for a plurality of rounds of to-be-evaluated voice interaction behaviors.

In an embodiment, the initial model includes:

$$P(Y \mid X) = \frac{1}{Z(X)} \exp(\Sigma_{i,k} \lambda_k t_k(y_{i-1}, y_i, x, i) + \Sigma_{i,l} u_l s_l(y_i, x, i));$$

where $Z(X) = \Sigma_y \exp(\Sigma_{i,k} \lambda_k t_k(y_{i-1}, y_i, x, i) + \Sigma_{i,l} u_l s_l(y_i, x, i))$, x represents an interaction feature sequence: $y_i$ represents a satisfaction mark corresponding to an i-th round of voice interaction behavior; $t_k(y_{i-1}, y_i, x, i)$ represents a first parameter function constructed on the basis of satisfaction with a previous round of voice interaction behavior, satisfaction with a current round of voice interaction behavior, and the interaction feature sequence; $s_l(y_i, x, i)$ represents a second parameter function constructed on the basis of satisfaction with the current round of voice interaction behavior and the interaction feature sequence; $\lambda_k$ represents a weight corresponding to the first parameter function, and $u_l$ represents a weight corresponding to the second parameter function; i represents a serial number of voice interaction behaviors; k represents a serial number of a first parameter, and l is a serial number of a second parameter.

In an embodiment, the training module 404 is further configured for:

obtaining the first parameter function, the second parameter function, the weight corresponding to the first parameter function, and the weight corresponding to the second parameter function through maximum likelihood estimation.

Figure 5:
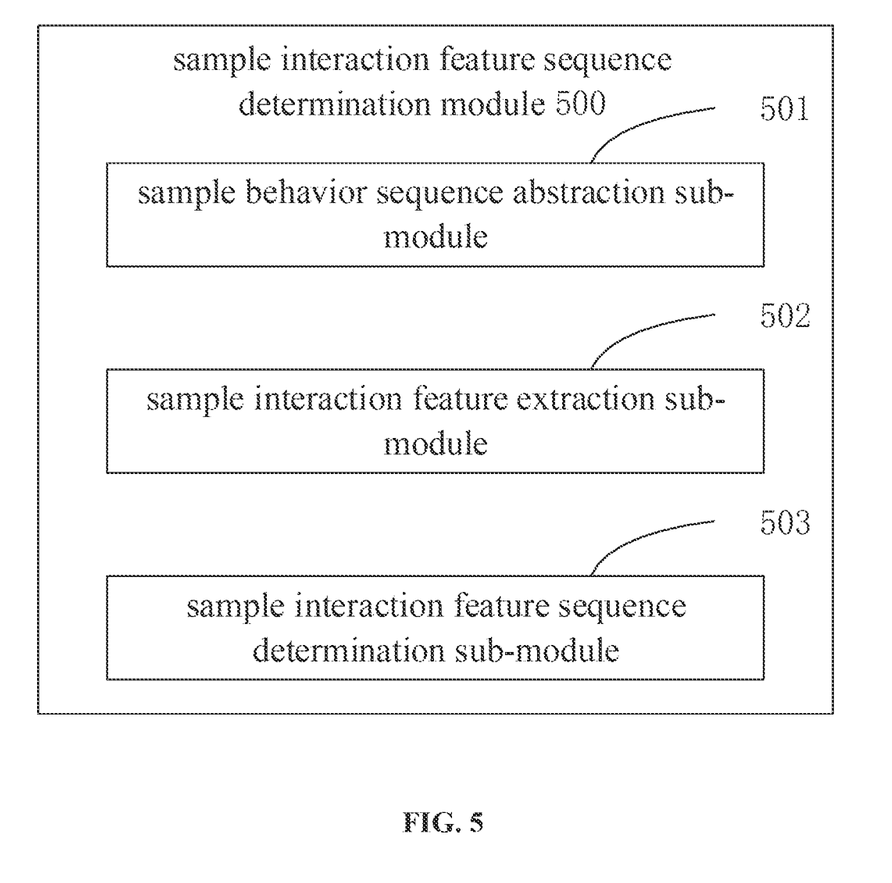
FIG. 5 is a block diagram of a module for determining a sequence of sample interaction features in FIG. 4.

In an embodiment, as shown in FIG. 5, the sample interaction feature sequence determination module 500 includes:

a sample behavior sequence abstraction sub-module 501, configured for abstracting a plurality of sample behavior sequences from the respective sample interaction data, wherein the plurality of sample behavior sequences correspond to the plurality of rounds of sample voice interaction behaviors, the sample behavior sequences include at least one of a voice rate, a voice word count, time information, a mood-based sentiment analysis, and a voice semantic subject of a user, and at least one of a response subject, a playing duration, and a completion or non-completion of playing of a device:

a sample interaction feature extraction sub-module 502, configured for performing feature extractions on the sample behavior sequences, to obtain the respective sample interaction features; and a sample interaction feature sequence determination sub-module 503, configured for sorting the respective sample interaction features according to a time order of corresponding sample voice interaction behaviors, to obtain the sample interaction feature sequence.

Here, the sample interaction feature sequence determination module 500 may be the same as or similar to the sample interaction feature sequence determination module 402.

In an embodiment, the sample interaction features include a user feature and a device feature.

In an embodiment, the user feature includes at least one of a voice rate, a voice word count, time information, a mood-based sentiment analysis, and a voice semantic subject; the device feature includes at least one of a response subject, a playing duration, and a completion or non-completion of playing.

Figure 6:
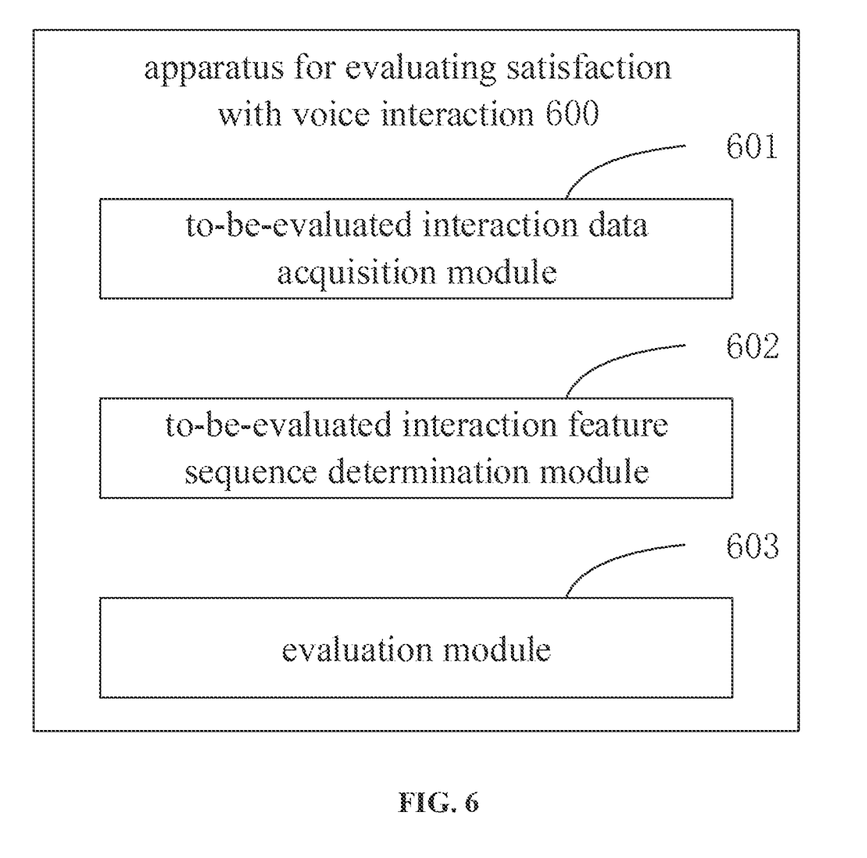
FIG. 6 is a block diagram of an apparatus for evaluating satisfaction with voice interaction according to an embodiment of the present disclosure.

According to an embodiment herein, it is further provided an apparatus for evaluating satisfaction with voice interaction, as shown in FIG. 6, the apparatus 600 for evaluating satisfaction with voice interaction includes:

a to-be-evaluated interaction data acquisition module 601, configured for acquiring to-be-evaluated interaction data of a plurality of rounds of to-be-evaluated voice interaction behaviors;

a to-be-evaluated interaction feature sequence determination module 602, configured for performing feature extractions on respective to-be-evaluated interaction data, to obtain a to-be-evaluated interaction feature sequence, wherein respective to-be-evaluated interaction features in the to-be-evaluated interaction feature sequence are sorted according to a time order of corresponding to-be-evaluated voice interaction behaviors; and an evaluation module 603, configured for inputting the to-be-evaluated interaction feature sequence into a model for evaluating satisfaction, to evaluate satisfaction with respective rounds of to-be-evaluated voice interaction behaviors, wherein the model for evaluating satisfaction is obtained by the generation apparatus according to an embodiment of the present disclosure.

Figure 7:
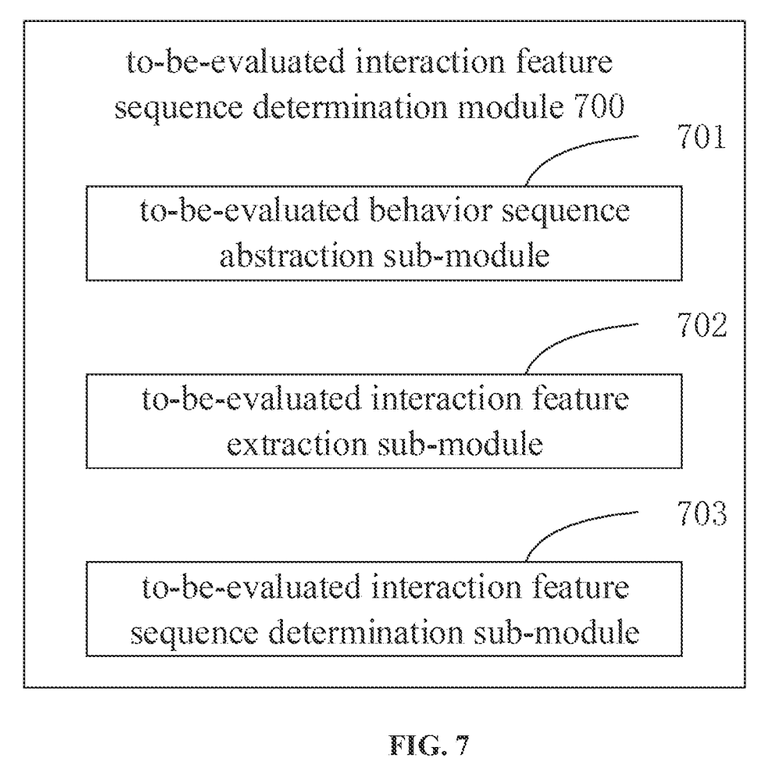
FIG. 7 is a block diagram of a module for determining a sequence of to-be-evaluated interaction features in FIG. 6.

In an embodiment, as shown in FIG. 7, the to-be-evaluated interaction feature sequence determination module 700 includes:

a to-be-evaluated behavior sequence abstraction sub-module 701, configured for abstracting a plurality of to-be-evaluated behavior sequences from the respective to-be-evaluated interaction data, wherein the plurality of to-be-evaluated behavior sequences correspond to the plurality of rounds of to-be-evaluated voice interaction behaviors, the to-be-evaluated behavior sequences include at least one of a voice rate, a voice word count, time information, a mood-based sentiment analysis, and a voice semantic subject of a user, and at least one of a response subject, a playing duration, and a completion or non-completion of playing of a device;

a to-be-evaluated interaction feature extraction sub-module 702, configured for performing feature extractions on the to-be-evaluated behavior sequences, to obtain the respective to-be-evaluated interaction features; and a to-be-evaluated interaction feature sequence determination sub-module 703, configured for sorting the respective to-be-evaluated interaction features according to a time order of corresponding to-be-evaluated voice interaction behaviors, to obtain the to-be-evaluated interaction feature sequence.

Here, the to-be-evaluated interaction feature sequence determination module 700 may be the same as or similar to the to-be-evaluated interaction feature sequence determination module 602.

In an embodiment, the to-be-evaluated interaction features include a user feature and a device feature.

In an embodiment, the user feature includes at least one of a voice rate, a voice word count, time information, a mood-based sentiment analysis, and a voice semantic subject; the device feature includes at least one of a response subject, a playing duration, and a completion or non-completion of playing.

In an embodiment, the evaluation module 603 is further configured for deriving a maximum probability path of the model for evaluating satisfaction by using dynamic programming through a Viterbi algorithm, to obtain a satisfaction evaluation sequence corresponding to the respective rounds of to-be-evaluated voice interaction behaviors.

The functions of each module in an apparatus of each embodiment herein can be known by referring to corresponding descriptions in the aforementioned method, which will not be described in detail herein.

In accordance with embodiments of the present application, the present application also provides an electronic device and a readable storage medium.

Figure 8:
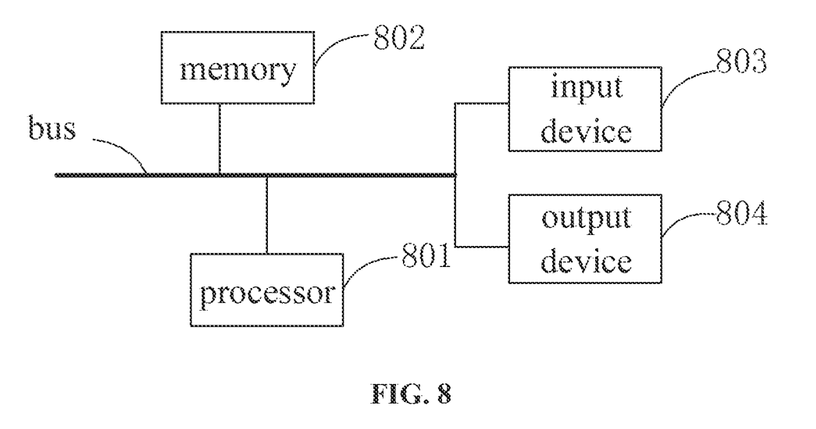
FIG. 8 is a block diagram of an electronic device for implementing embodiments of the present disclosure.

FIG. 8 is a block diagram of an electronic device to implement a generation or an evaluation method according to an embodiment of the present disclosure. The electronic device is intended to represent various forms of digital computers, such as laptop computers, desktop computers, workbenches, personal digital assistants, servers, blade servers, mainframe computers, and other suitable computers. Electronic apparatuses may also represent various forms of mobile devices, such as personal digital assistants, cellular phones, smart phones, wearable devices, and other similar computing devices. The components shown herein, their connections and relationships, and their functions are merely examples, and are not intended to limit the implementation of the present disclosure described and/or claimed herein.

As shown in FIG. 8, the electronic device includes: one or more processors 801, memory 802, and interfaces for connecting components, including high-speed interfaces and low-speed interfaces. The various components are interconnected thorough different buses and may be mounted on a common motherboard or otherwise as desired. The processor may process instructions for execution within the electronic device, including instructions stored in or on a memory to display graphical information of a GUI on an external input/output means, such as a display device coupled to an interface. In other embodiments, multiple processors and/or multiple buses may be used with multiple memories, if desired. Likewise, connections may be made among multiple electronic devices, each providing some of the necessary operations (e.g., as an array of servers, a set of blade servers, or a multiprocessor system). An example of one processor 801 is shown in FIG. 8.

The memory 802 is the non-transitory computer-readable storage medium provided herein. Herein, the memory stores instructions executable by at least one processor to cause the at least one processor to perform the generation or evaluation method provided herein. The non-transitory computer-readable storage medium of the present disclosure stores computer instructions for causing a computer to execute the generation method or the evaluation method provided herein.

The memory 802, as a non-transitory computer-readable storage medium, may be used to store non-transitory software programs, non-transitory computer-executable programs, and modules, for example, program instructions/modules corresponding to the generation/evaluation method or the generation/evaluation apparatus in embodiments of the present disclosure. The processor 801 executes various functional applications of the server and data processing, i.e., implements the generation/evaluation method in the above-described method embodiment, by running non-transient software programs, instructions, and modules stored in the memory 802.

The memory 802 may include a storage program section and a storage data section, wherein the storage program section may store an operating system, an application program required for at least one function; the storage data section may store data and the like created according to use of the electronic device to implement the method for generating or evaluating. In addition, the memory 802 may include a high-speed random-access memory, and may also include a non-transitory memory, such as at least one disk storage device, flash memory device, or other non-transitory solid state storage devices. In some embodiments, the memory 802 optionally includes memories remotely located with respect to processor 801, which may be connected to the electronic device to implement the method for generating or evaluating via a network. Examples of such networks include, but are not limited to, the Internet, intranets, local area networks, mobile communication networks, and combinations thereof.

The electronic device may further include: an input device 803 and an output device 804. The processor 801, the memory 802, the input device 803 and the output device 804 may be connected through a bus or other means, exemplified by a bus connection in FIG. 8.

The input device 803 may receive input numeric or character information and generate key signal inputs related to user settings and functional controls of the sensed electronic equipment, such as input devices of touch screens, keypads, mice, track pads, touch pads, pointing sticks, one or more mouse buttons, track balls, joysticks, etc. The output device 804 may include display devices, auxiliary lighting devices (e.g., LEDs), tactile feedback devices (e.g., vibration motors), and the like. The display device may include, but is not limited to, a liquid crystal display (LCD), a light emitting diode (LED) display, and a plasma display. In some embodiments, the display device may be a touch screen.

Various embodiments of the systems and techniques described herein may be implemented in digital electronic circuit systems, integrated circuit systems, disclosure specific ASICs (disclosure specific integrated circuits), computer hardware, firmware, software, and/or combinations thereof. These various embodiments may be embodied in one or more computer programs, which can be executed and/or interpreted on a programmable system including at least one programmable processor, which can be a dedicated or general-purpose programmable processor, and can receive data and instructions from, and transmit data and instructions to, a memory system, at least one input device, and at least one output device, and the at least one output device.

These computing programs (also referred to as programs, software, software disclosures, or code) include machine instructions of a programmable processor, and may be implemented using high-level procedural and/or object-oriented programming languages, and/or assembly/machine languages. As used herein, the terms "machine-readable medium" and "computer-readable medium" refer to any computer program product, equipment, and/or device (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide interaction with a user, the systems and techniques described herein may be implemented on a computer having: a display device (e.g., a CRT (cathode ray tube) or LCD (liquid crystal display) monitor) for displaying information to a user, and a keyboard and a pointing device (e.g., a mouse or a trackball) through which a user can provide input to the computer. Other types of devices may also be used to provide interaction with a user. For example, the feedback provided to the user may be any form of sensory feedback (e.g., visual feedback, auditory feedback, or tactile feedback); and input from the user may be received in any form, including acoustic input, voice input, or tactile input.

The systems and techniques described herein may be implemented in a computing system that includes a background component (e.g., as a data server), or a computing system that includes a middleware component (e.g., an disclosure server), or a computing system that includes a front-end component (e.g., a user computer having a graphical user interface or a web browser, wherein a user may interact with embodiments of the systems and techniques described herein through the graphical user interface or the web browser), or in a computing system that includes any combination of such background components, middleware components, or front-end components. The components of the system may be interconnected by any form or medium of digital data communication (e.g., a communication network). Examples of communication networks include: local Area Networks (LANs). Wide Area Networks (WANs), and the Internet.

A computer system may include a client and a server. The client and server are typically remote from each other and typically interact through a communication network. The relation of the client and the server is generated by computer programs running on respective computers and having a client-server relation with each other. The server can be a cloud server, also called a cloud computing server or a cloud host, is a host product in a cloud computing service system, and solves the defects of high management difficulty and weak business expansibility in the traditional physical host and virtual private server (VPS) service. The server can also be a server of a distributed system, or a server combined with a blockchain.

It should be understood that the various forms of flow, reordering, adding or removing steps shown above may be used. For example, the steps recited in the present disclosure may be performed in parallel or sequentially or may be performed in a different order, so long as the desired results of the technical solutions disclosed in the present disclosure can be achieved, and no limitation is made herein.

The above-mentioned embodiments are not to be construed as limiting the scope of the present disclosure. It will be apparent to those skilled in the art that various modifications, combinations, sub-combinations and substitutions are possible, depending on design requirements and other factors. Any modifications, equivalents, and improvements within the spirit and principles of this disclosure are intended to be included within the scope of this disclosure.

What is claimed is:

1. A method for generating a model for evaluating satisfaction with voice interaction, comprising:
acquiring sample interaction data of a plurality of rounds of sample voice interaction behaviors;
performing feature extractions on respective sample interaction data, to obtain a sample interaction feature sequence, wherein respective sample interaction features in the sample interaction feature sequence are sorted according to a time order of corresponding sample voice interaction behaviors;
acquiring satisfaction marks corresponding to the respective sample interaction data, to obtain a satisfaction mark sequence, wherein respective satisfaction mark data in the satisfaction mark sequence are sorted according to a time order of corresponding sample voice interaction behaviors; and
training an initial model by using a plurality of sets of sample interaction feature sequences and of satisfaction mark sequences, to obtain the model for evaluating satisfaction, wherein the model for evaluating satisfaction is used for evaluating satisfaction with respective rounds of to-be-evaluated voice interaction behaviors according to to-be-evaluated interaction data for a plurality of rounds of to-be-evaluated voice interaction behaviors,
wherein the initial model comprises:

$$P(Y \mid X) = \frac{1}{Z(X)} \exp(\Sigma_{i,k} \lambda_k t_k(y_{i-1}, y_i, x, i) + \Sigma_{i,l} u_l s_l(y_i, x, i));$$

wherein $Z(X) = \Sigma_y \exp(\Sigma_{i,k} \lambda_k t_k(y_{i-1}, y_i, x, i) + \Sigma_{i,l} u_l s_l(y_i, x, i))$; x represents an interaction feature sequence; $y_i$ represents a satisfaction mark corresponding to an i-th round of voice interaction behavior; $t_k(y_{i-1}, y_i, x, i)$ represents a first parameter function constructed on the basis of satisfaction with a previous round of voice interaction behavior, satisfaction with a current round of voice interaction behavior, and the interaction feature sequence; $s_l(y_i, x, i)$ represents a second parameter function constructed on the basis of satisfaction with the current round of voice interaction behavior and the interaction feature sequence; $\lambda_k$ represents a weight corresponding to the first parameter function, and $u_l$ represents a weight corresponding to the second parameter function; i represents a serial number of voice interaction behaviors; k represents a serial number of a first parameter, and l is a serial number of a second parameter.

2. The method according to claim 1, wherein the training the initial model by using the voice interaction feature sequence and the satisfaction mark sequence, to obtain the model for evaluating satisfaction, comprises:
obtaining the first parameter function, the second parameter function, the weight corresponding to the first parameter function, and the weight corresponding to the second parameter function through maximum likelihood estimation.

3. The method according to claim 1, wherein the performing the feature extraction on the respective sample interaction data, to obtain the sample interaction feature sequence, comprises:
abstracting a plurality of sample behavior sequences from the respective sample interaction data, wherein the plurality of sample behavior sequences correspond to the plurality of rounds of sample voice interaction behaviors, the sample behavior sequences comprise at least one of a voice rate, a voice word count, time information, a mood-based sentiment analysis, and a voice semantic subject of a user, and at least one of a response subject, a playing duration, and a completion or non-completion of playing of a device;
performing feature extractions on the sample behavior sequences, to obtain the respective sample interaction features; and
sorting the respective sample interaction features according to a time order of corresponding sample voice interaction behaviors, to obtain the sample interaction feature sequence.

4. The method according to claim 1, wherein the sample interaction features comprise a user feature and a device feature.

5. The method according to claim 4, wherein the user feature comprises at least one of a voice rate, a voice word count, time information, a mood-based sentiment analysis, and a voice semantic subject; the device feature comprises at least one of a response subject, a playing duration, and a completion or non-completion of playing.

6. A method for evaluating satisfaction with voice interaction, comprising:
acquiring to-be-evaluated interaction data of a plurality of rounds of to-be-evaluated voice interaction behaviors;
performing feature extractions on respective to-be-evaluated interaction data, to obtain a to-be-evaluated interaction feature sequence, wherein respective to-be-evaluated interaction features in the to-be-evaluated interaction feature sequence are sorted according to a time order of corresponding to-be-evaluated voice interaction behaviors; and
inputting the to-be-evaluated interaction feature sequence into a model for evaluating satisfaction, to evaluate satisfaction with respective rounds of to-be-evaluated voice interaction behaviors, wherein the model for evaluating satisfaction is obtained by the generation method according to claim 1.

7. The method according to claim 6, wherein the performing the feature extractions on the respective to-be-evaluated interaction data, to obtain the to-be-evaluated interaction feature sequence, comprises:
abstracting a plurality of to-be-evaluated behavior sequences from the respective to-be-evaluated interaction data, wherein the plurality of to-be-evaluated behavior sequences correspond to the plurality of rounds of to-be-evaluated voice interaction behaviors, the to-be-evaluated behavior sequences comprise at least one of a voice rate, a voice word count, time information, a mood-based sentiment analysis, and a voice semantic subject of a user, and at least one of a response subject, a playing duration, and a completion or non-completion of playing of a device;
performing feature extractions on the to-be-evaluated behavior sequences, to obtain the respective to-be-evaluated interaction features; and
sorting the respective to-be-evaluated interaction features according to a time order of corresponding to-be-evaluated voice interaction behaviors, to obtain the to-be-evaluated interaction feature sequence.

8. The method according to claim 6, wherein the to-be-evaluated interaction features comprise a user feature and a device feature.

9. The method according to claim 8, wherein the user feature comprises at least one of a voice rate, a voice word count, time information, a mood-based sentiment analysis, and a voice semantic subject; the device feature comprises at least one of a response subject, a playing duration, and a completion or non-completion of playing.

10. The method according to claim 6, wherein the evaluating the satisfaction with the respective rounds of to-be-evaluated voice interaction behaviors comprises:
deriving a maximum probability path of the model for evaluating satisfaction by using dynamic programming through a Viterbi algorithm, to obtain a satisfaction evaluation sequence corresponding to the respective rounds of to-be-evaluated voice interaction behaviors.

11. An electronic device, comprising:
at least one processor;
and a memory communicatively connected to the at least one processor, wherein
the memory stores instructions executable by the at least one processor, and the instructions are executed by the at least one processor to enable the at least one processor to perform:
acquire sample interaction data of a plurality of rounds of sample voice interaction behaviors;
perform feature extractions on respective sample interaction data, to obtain a sample interaction feature sequence, wherein respective sample interaction features in the sample interaction feature sequence are sorted according to a time order of corresponding sample voice interaction behaviors;
acquire satisfaction marks corresponding to the respective sample interaction data, to obtain a satisfaction mark sequence, wherein respective satisfaction mark data in the satisfaction mark sequence are sorted according to a time order of corresponding sample voice interaction behaviors; and
train an initial model by using a plurality of sets of sample interaction feature sequences and of satisfaction mark sequences, to obtain the model for evaluating satisfaction, wherein the model for evaluating satisfaction is used for evaluating satisfaction with respective rounds of to-be-evaluated voice interaction behaviors according to to-be-evaluated interaction data for a plurality of rounds of to-be-evaluated voice interaction behaviors, wherein the initial model comprises:

$$P(Y \mid X) = \frac{1}{Z(X)} \exp(\Sigma_{i,k} \lambda_k t_k(y_{i-1}, y_i, x, i) + \Sigma_{i,l} u_l s_l(y_i, x, i));$$

wherein $Z(X) = \Sigma_y \exp(\Sigma_{i,k} \lambda_k t_k(y_{i-1}, y_i, x, i) + \Sigma_{i,l} u_l s_l(y_i, x, i)); x$ represents an interaction feature sequence; $y_i$ represents a satisfaction mark corresponding to an i-th round of voice interaction behavior; $t_k(y_{i-1}, y_i, x, i)$ represents a first parameter function constructed on the basis of satisfaction with a previous round of voice interaction behavior, satisfaction with a current round of voice interaction behavior, and the interaction feature sequence; $s_l(y_i, x, i)$ represents a second parameter function constructed on the basis of satisfaction with the current round of voice interaction behavior and the interaction feature sequence; $\lambda_k$ represents a weight corresponding to the first parameter function, and $u_l$ represents a weight corresponding to the second parameter function; i represents a serial number of voice interaction behaviors; k represents a serial number of a first parameter, and l is a serial number of a second parameter.

12. The electronic device according to claim 11, wherein the instructions are executed by the at least one processor to further enable the at least one processor to:
obtain the first parameter function, the second parameter function, the weight corresponding to the first parameter function, and the weight corresponding to the second parameter function through maximum likelihood estimation.

13. The electronic device according to claim 11, wherein the instructions are executed by the at least one processor to further enable the at least one processor to:
abstract a plurality of sample behavior sequences from the respective sample interaction data, wherein the plurality of sample behavior sequences correspond to the plurality of rounds of sample voice interaction behaviors, the sample behavior sequences comprise at least one of a voice rate, a voice word count, time information, a mood-based sentiment analysis, and a voice semantic subject of a user, and at least one of a response subject, a playing duration, and a completion or non-completion of playing of a device;
perform feature extractions on the sample behavior sequences, to obtain the respective sample interaction features; and
sort the respective sample interaction features according to a time order of corresponding sample voice interaction behaviors, to obtain the sample interaction feature sequence.

14. The electronic device according to claim 11, wherein the sample interaction features comprise a user feature and a device feature.

15. The electronic device according to claim 14, wherein the user feature comprises at least one of a voice rate, a voice word count, time information, a mood-based sentiment analysis, and a voice semantic subject; the device feature comprises at least one of a response subject, a playing duration, and a completion or non-completion of playing.

16. The electronic device according to claim 11, wherein the instructions are executed by the at least one processor to further enable the at least one processor to:
acquire to-be-evaluated interaction data of a plurality of rounds of to-be-evaluated voice interaction behaviors;
perform feature extractions on respective to-be-evaluated interaction data, to obtain a to-be-evaluated interaction feature sequence, wherein respective to-be-evaluated interaction features in the to-be-evaluated interaction feature sequence are sorted according to a time order of corresponding to-be-evaluated voice interaction behaviors; and
input the to-be-evaluated interaction feature sequence into a model for evaluating satisfaction, to evaluate satisfaction with respective rounds of to-be-evaluated voice interaction behaviors, wherein the model for evaluating satisfaction is obtained by:
acquiring sample interaction data of a plurality of rounds of sample voice interaction behaviors;
performing feature extractions on respective sample interaction data, to obtain a sample interaction feature sequence, wherein respective sample interaction features in the sample interaction feature sequence are sorted according to a time order of corresponding sample voice interaction behaviors:
acquiring satisfaction marks corresponding to the respective sample interaction data, to obtain a satisfaction mark sequence, wherein respective satisfaction mark data in the satisfaction mark sequence are sorted according to a time order of corresponding sample voice interaction behaviors; and
training an initial model by using a plurality of sets of sample interaction feature sequences and of satisfaction mark sequences, to obtain the model for evaluating satisfaction, wherein the model for evaluating satisfaction is used for evaluating satisfaction with respective rounds of to-be-evaluated voice interaction behaviors according to to-be-evaluated interaction data for a plurality of rounds of to-be-evaluated voice interaction behaviors.

17. The electronic device according to claim 16, wherein the instructions are executed by the at least one processor to further enable the at least one processor to:
abstract a plurality of to-be-evaluated behavior sequences from the respective to-be-evaluated interaction data, wherein the plurality of to-be-evaluated behavior sequences correspond to the plurality of rounds of to-be-evaluated voice interaction behaviors, the to-be-evaluated behavior sequences comprise at least one of a voice rate, a voice word count, time information, a mood-based sentiment analysis, and a voice semantic subject of a user, and at least one of a response subject, a playing duration, and a completion or non-completion of playing of a device;
perform feature extractions on the to-be-evaluated behavior sequences, to obtain the respective to-be-evaluated interaction features; and
sort the respective to-be-evaluated interaction features according to a time order of corresponding to-be-evaluated voice interaction behaviors, to obtain the to-be-evaluated interaction feature sequence.

18. A non-transitory computer-readable storage medium storing computer instructions, wherein the computer instructions, when executed by a computer, cause the computer to:
acquire sample interaction data of a plurality of rounds of sample voice interaction behaviors;
perform feature extractions on respective sample interaction data, to obtain a sample interaction feature sequence, wherein respective sample interaction features in the sample interaction feature sequence are sorted according to a time order of corresponding sample voice interaction behaviors;
acquire satisfaction marks corresponding to the respective sample interaction data, to obtain a satisfaction mark sequence, wherein respective satisfaction mark data in the satisfaction mark sequence are sorted according to a time order of corresponding sample voice interaction behaviors; and
train an initial model by using a plurality of sets of sample interaction feature sequences and of satisfaction mark sequences, to obtain the model for evaluating satisfaction, wherein the model for evaluating satisfaction is used for evaluating satisfaction with respective rounds of to-be-evaluated voice interaction behaviors according to to-be-evaluated interaction data for a plurality of rounds of to-be-evaluated voice interaction behaviors, wherein the initial model comprises:

$$P(Y \mid X) = \frac{1}{Z(X)} \exp(\Sigma_{i,k} \lambda_k t_k(y_{i-1}, y_i, x, i) + \Sigma_{i,l} u_l s_l(y_i, x, i));$$

wherein $Z(X) = \Sigma_y \exp(\Sigma_{i,k} \lambda_k t_k(y_{i-1}, y_i, x, i) + \Sigma_{i,l} u_l s_l(y_i, x, i))$; x represents an interaction feature sequence; $y_i$ represents a satisfaction mark corresponding to an i-th round of voice interaction behavior; $t_k(y_{i-1}, y_i, x, i)$ represents a first parameter function constructed on the basis of satisfaction with a previous round of voice interaction behavior, satisfaction with a current round of voice interaction behavior, and the interaction feature sequence; $s_l(y_i, x, i)$ represents a second parameter function constructed on the basis of satisfaction with the current round of voice interaction behavior and the interaction feature sequence; $\lambda_k$ represents a weight corresponding to the first parameter function, and $u_l$ represents a weight corresponding to the second parameter function; i represents a serial number of voice interaction behaviors; k represents a serial number of a first parameter, and l is a serial number of a second parameter.

* * * * *